US006448746B1

(12) United States Patent
Carlson

(10) Patent No.: US 6,448,746 B1
(45) Date of Patent: Sep. 10, 2002

(54) MULTIPLE PHASE VOLTAGE REGULATOR SYSTEM

(75) Inventor: Jeffrey A. Carlson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/608,201

(22) Filed: Jun. 30, 2000

(51) Int. Cl.[7] ................................................ G05F 1/40
(52) U.S. Cl. ..................... 323/272; 323/283; 324/76.59
(58) Field of Search ........................ 710/22; 324/76.59; 323/283, 272, 285, 287, 286, 290; 439/912; 307/86

(56) References Cited

U.S. PATENT DOCUMENTS

| | | | |
|---|---|---|---|
| 4,137,565 A | * | 1/1979 | Mager et al. .................. 710/22 |
| 5,390,068 A | * | 2/1995 | Schultz et al. ................. 307/87 |
| 5,638,264 A | | 6/1997 | Hayashi, et al. ............... 363/65 |
| 5,929,618 A | | 7/1999 | Boylan, et al. .............. 323/282 |
| 6,031,743 A | * | 2/2000 | Carpenter et al. ............. 363/65 |
| 6,052,790 A | | 4/2000 | Brown ........................ 713/300 |

FOREIGN PATENT DOCUMENTS

| | | |
|---|---|---|
| WO | WO 96/24234 | 8/1996 |
| WO | WO 00/33153 | 6/2000 |

* cited by examiner

*Primary Examiner*—Shawn Riley
(74) *Attorney, Agent, or Firm*—Trop, Pruner & Hu, P.C.

(57) ABSTRACT

An apparatus includes connectors and a circuit. Each connector is capable of receiving and coupling a different voltage regulator module to a circuit board. The circuit is coupled to the connectors to form a multiple phase voltage regulator system out of the voltage regulator modules that are received by the connectors. The circuit establishes the number of phases of the multiple phase voltage regulator system based on the number of voltage regulator modules that are received by the connectors.

23 Claims, 13 Drawing Sheets

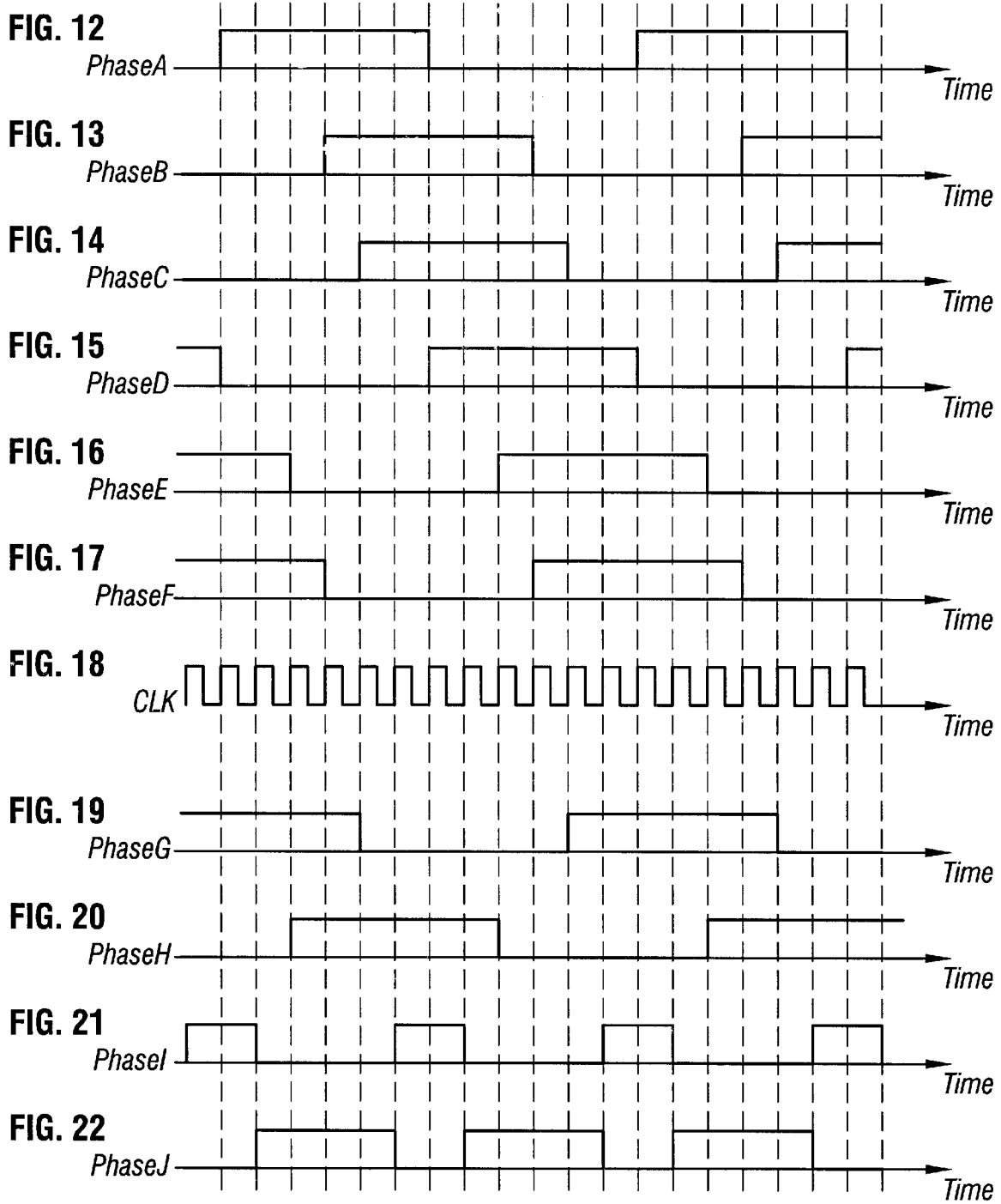

MULTIPLE PHASE VOLTAGE REGULATOR SYSTEM

BACKGROUND

The invention generally relates to a multiple phase voltage regulator system.

A DC-to-DC voltage regulator typically is used to convert a DC input voltage to either a higher or a lower DC output voltage. One type of voltage regulator is a switching regulator that is often chosen due to its small size and efficiency. The switching regulator typically includes one or more switches that are rapidly opened and closed to transfer energy between an inductor (a stand-alone inductor or a transformer, as examples) and an input voltage source in a manner that regulates an output voltage.

As an example, referring to FIG. 1, one type of switching regulator is a Buck switching regulator 10 that receives an input DC voltage (called $V_{IN}$) and converts the $V_{IN}$ voltage to a lower regulated output voltage (called $V_{OUT}$) that appears at an output terminal 11. To accomplish this, the regulator 10 includes switches 20 and 21 (a combination of a metal-oxide-semiconductor field-effect-transistor (MOSFET) and a passive diode or twin MOSFETs, for example). Switch 20 is operated (via a voltage called $V_{SW}$) in a manner to regulate the $V_{OUT}$ voltage, as described below.

Referring also FIGS. 2 and 3, in particular, the switch 20 opens and closes to control energization/de-energization cycles 19 (each having a constant duration called $T_S$) of an inductor 14. In each cycle 19, the regulator 10 asserts, or drives high, the $V_{SW}$ voltage during an on interval (called $T_{ON}$) to close the switch 20 and transfer energy from an input voltage source 9 to the inductor 14. During the $T_{ON}$ interval, a current (called $I_L$) of the inductor 14 has a positive slope. During an off interval (called $T_{OFF}$) of the cycle 19, the regulator 10 deasserts, or drives low, the $V_{SW}$ voltage to open the switch 20 and isolate the input voltage source 9 from the inductor 14. At this point, the level of the $I_L$ current is not abruptly halted, but rather, the switch 21 begins conducting to transfer energy from the inductor 14 to a bulk capacitor 16 and a load (not shown) that are coupled to the output terminal 11. The bulk capacitor 16 serves as a stored energy source that is depleted by the load, and additional energy is transferred from the inductor 14 to the bulk capacitor 16 during each $T_{ON}$ interval.

For the Buck switching regulator, the ratio of the $T_{ON}$ interval to the total switching period, $T_S$ (summation of $T_{ON}+T_{OFF}$), called a duty cycle, generally governs the ratio of the $V_{OUT}$ to the $V_{IN}$ voltages. Thus, to increase the $V_{OUT}$ voltage, the duty cycle may be increased, and to decrease the $V_{OUT}$ voltage, the duty cycle may be decreased.

As an example, the regulator 10 may include a controller 15 (see FIG. 1) that regulates the $V_{OUT}$ voltage by using a pulse width modulation (PWM) technique to control the duty cycle. In this manner, the controller 15 may include an error amplifier 23 that amplifies the difference between a reference voltage (called $V_{REF}$) and a voltage (called $V_P$ (see FIG. 1)) that is proportional to the $V_{OUT}$ voltage. Referring also to FIG. 5, the controller 15 may include a comparator 26 that compares the resultant amplified voltage (called $V_C$) with a sawtooth voltage (called $V_{SAW}$) and provides the $V_{SW}$ signal that indicates the result of the comparison. The $V_{SAW}$ voltage is provided by a sawtooth oscillator 25 and has a constant frequency (i.e., $1/T_S$).

Due to the above-described arrangement, when the $V_{OUT}$ voltage increases, the $V_C$ voltage decreases and causes the duty cycle to decrease to counteract the increase in $V_{OUT}$. Conversely, when the $V_{OUT}$ voltage decreases, the $V_C$ voltage increases and causes the duty cycle to increase to counteract the decrease in $V_{OUT}$.

The voltage regulator may be made in the form of a voltage regulator module (VRM), a semiconductor package, or chip, that may be inserted into a corresponding connector slot, for example. More particularly, multiple VRMs, such as the VRMs 37 and 38 that are depicted in FIG. 6, may be coupled in parallel to form a multiple phase voltage regulator system 36. In this manner, referring also FIGS. 7 and 8, energization/de-energization cycles 40a (depicted by an internal switching voltage of the VRM 37 called $V_{SW1}$) of the VRM 37 is interleaved with respect to the energization cycles 40b (depicted by an internal switching voltage of the VRM 38 called $V_{SW2}$) of the VRM 38. As depicted in FIGS. 7 and 8, the effective switching period (called $T_{S1}$) of the system 36 is one half as long as the switching period (called $T_{S2}$) of either VRM 37 or 38. Thus, the system 36 operates at twice the switching frequency of the VRM 37, 38, an operation that provides better transient response performance than either VRM 37, 38 may provide by itself. More than two VRMs (three or four, for example) may be coupled together in parallel and interleaved accordingly to further increase the overall switching frequency of the system 36.

For purposes of ensuring that each VRM 37, 38 operates in the appropriate time slot, the energization/de-energization cycles of VRMs 37 and 38 may be controlled by synchronization signals to regulate the phasing of the system 36. In this manner, the VRM 37 may receive a SYNC1 signal that is depicted in FIG. 9, and the VRM 38 may receive a SYNC2 signal that is depicted in FIG. 10. The SYNC1 signal includes pulses 42a, each of which enables a particular energization/de-energization cycle of the VRM 37. The pulses 42a are interleaved with pulses 42b of the SYNC2 signal. Each pulse 42b of the SYNC2 signal enables a particular energization/de-energization cycle of the VRM 38.

A system of interleaved VRMs (such as the system 36, for example) may supply power to a computer system. In this manner, a motherboard may include several slots, or connectors, to receive VRMs. For purposes of providing flexibility in the number of VRMs that are used and thus, the number of phases of the system, the connectors typically appear in an ordered sequence on the motherboard. This sequence defines the placement of the VRMs to form a particular multiple phase system. If the VRMs are not inserted into the appropriate slots, then the appropriate synchronization signals may not be furnished to the slots, and thus, the power supply system may not function properly.

For example, a particular motherboard may have four VRM slots: Slot1, Slot2, Slot3 and Slot4. To establish a two phase voltage regulator system, an ordering scheme that is imposed by the motherboard may require that the two VRMs are inserted in Slot1 and Slot2, as Slot1 and Slot2 receive the synchronization signals to implement a two phase interleaved switching regulator system. Thus, if the VRMs are inserted into Slot1 and Slot3, for example, the voltage regulator system may not function properly. Therefore, such an arrangement does not allow flexibility in the insertion and use of the VRMs.

Thus, there is a continuing need for an arrangement that addresses one or more of the problems that are stated above.

BRIEF DESCRIPTION OF THE DRAWING

FIGS. 12, 13, 14, 15, 16, 17, 18, 19, 20, 21 and 22 are waveforms illustrating operation of the system of FIG. 11 according to an embodiment of the invention.

DETAILED DESCRIPTION

Figure 1:
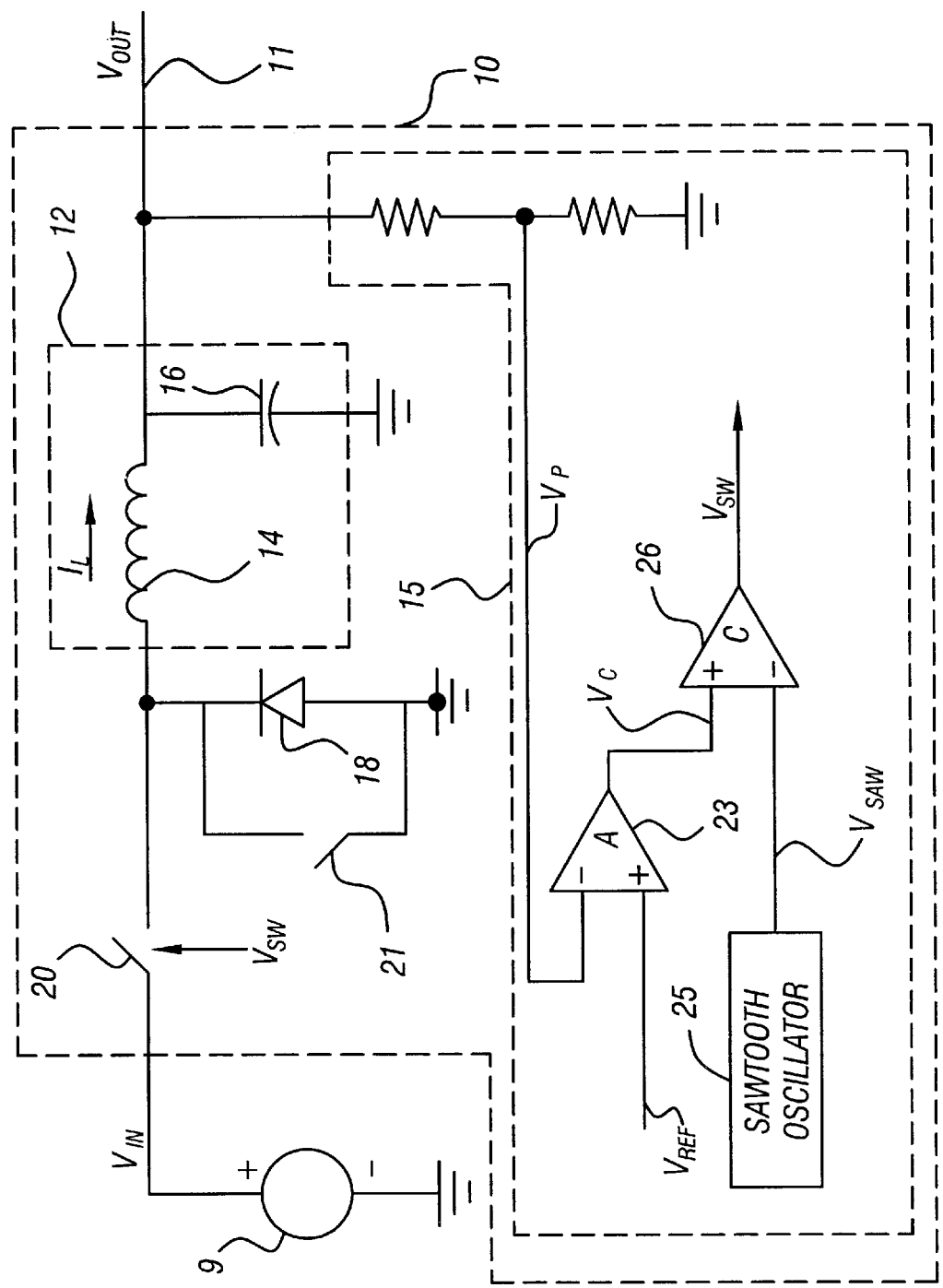
FIG. 1 is a schematic diagram of a switching voltage regulator of the prior art.
Figures 2, 3, 4, 5:
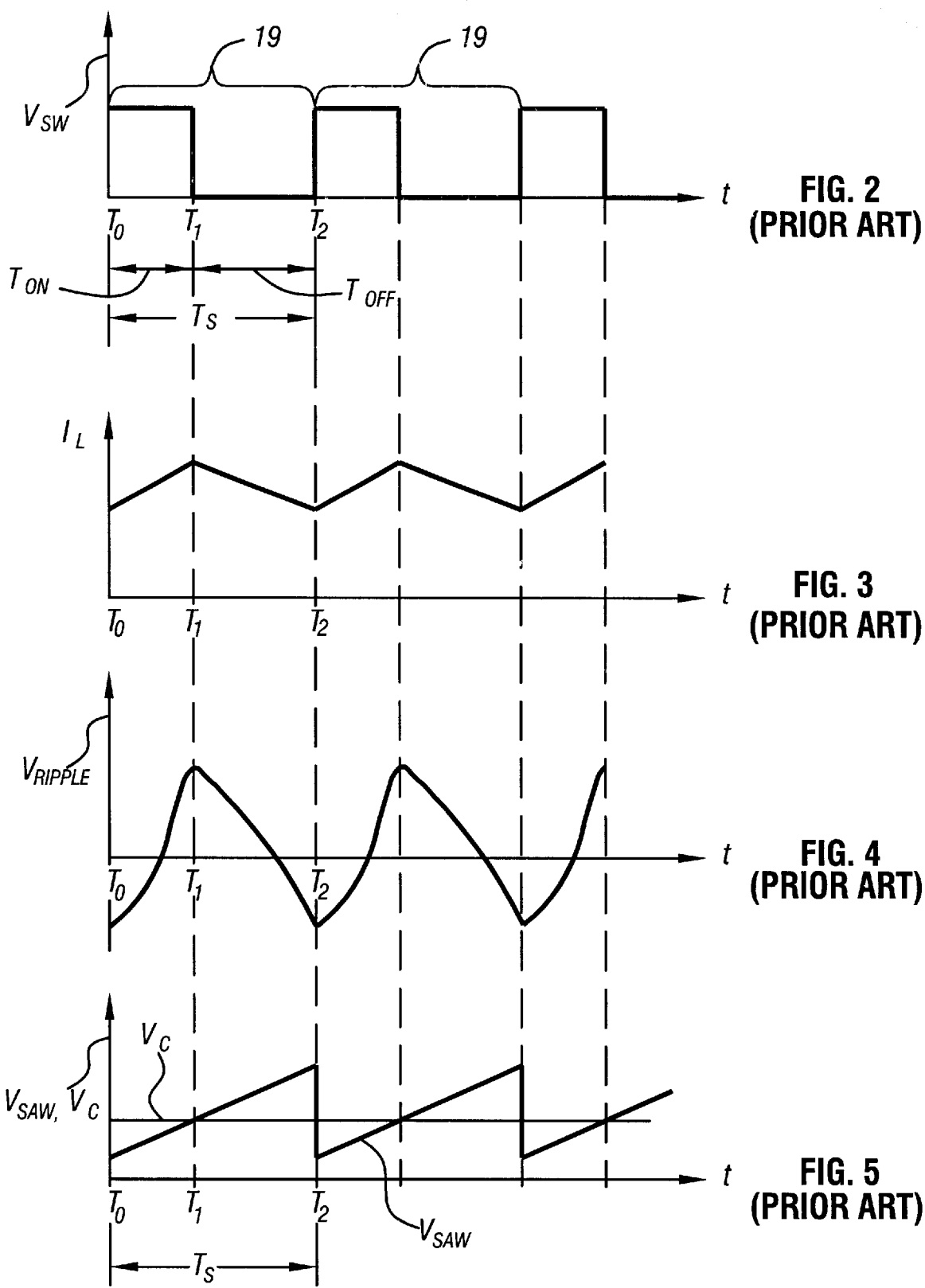
FIGS. 2, 3, 4 and 5 are signal waveforms that illustrate operation of the regulator of FIG. 1.
Figure 6:
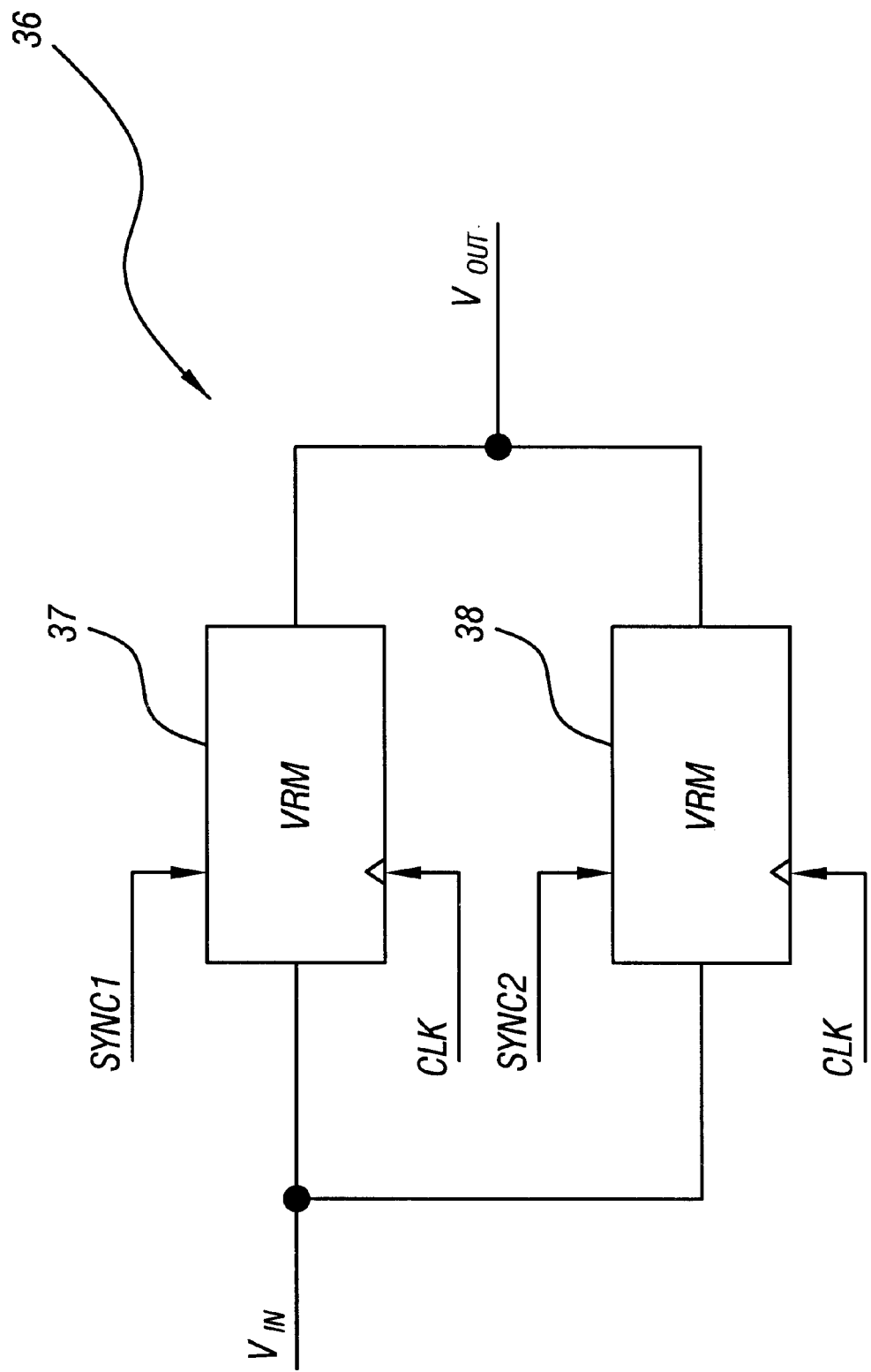
FIG. 6 is a schematic diagram of a multiple phase voltage regulator system of the prior art.
Figure 7:
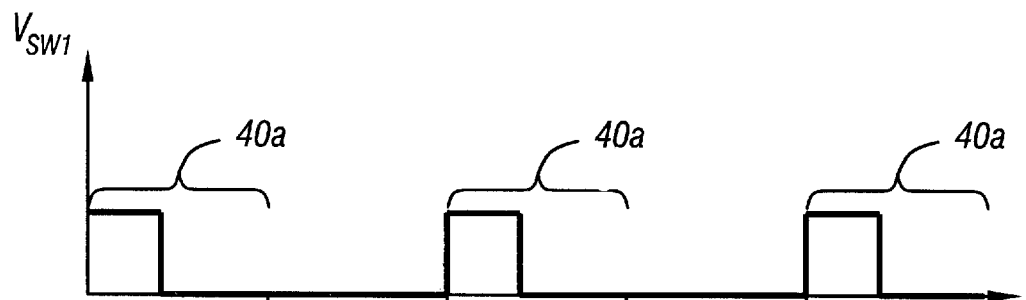
FIGS. 7 and 8 are waveforms depicting different switching signals that control energization/de-energization cycles of different voltage regulator modules of the system of FIG. 6.
Figure 8:
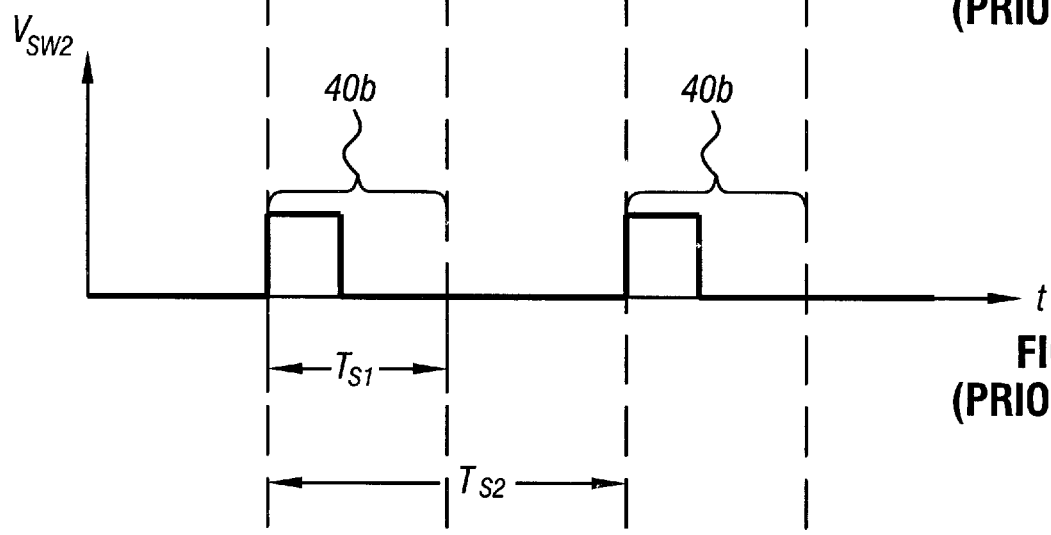
Figure 9:
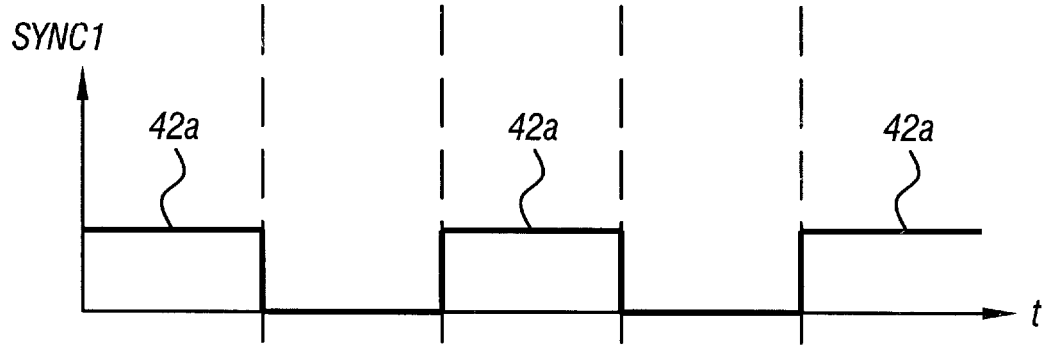
FIGS. 9 and 10 are waveforms depicting synchronization signals used to control the voltage regulator modules of the system of FIG. 6.
Figure 10:
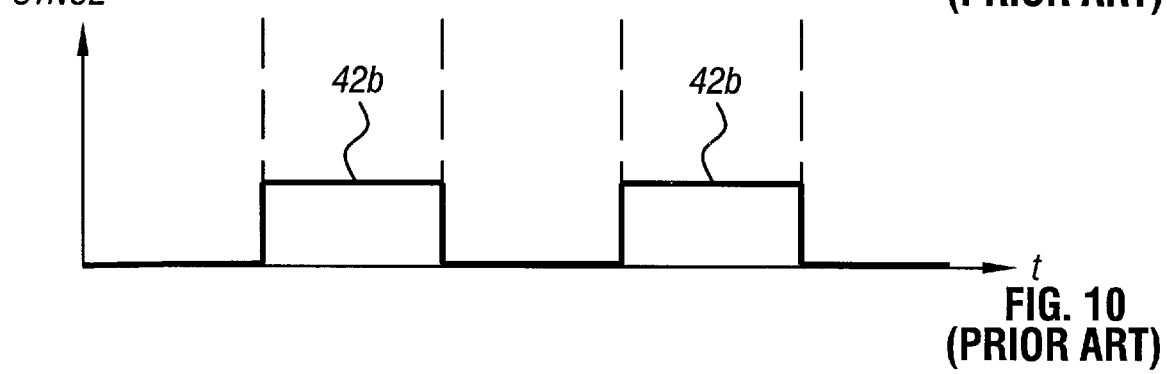
Figure 11:
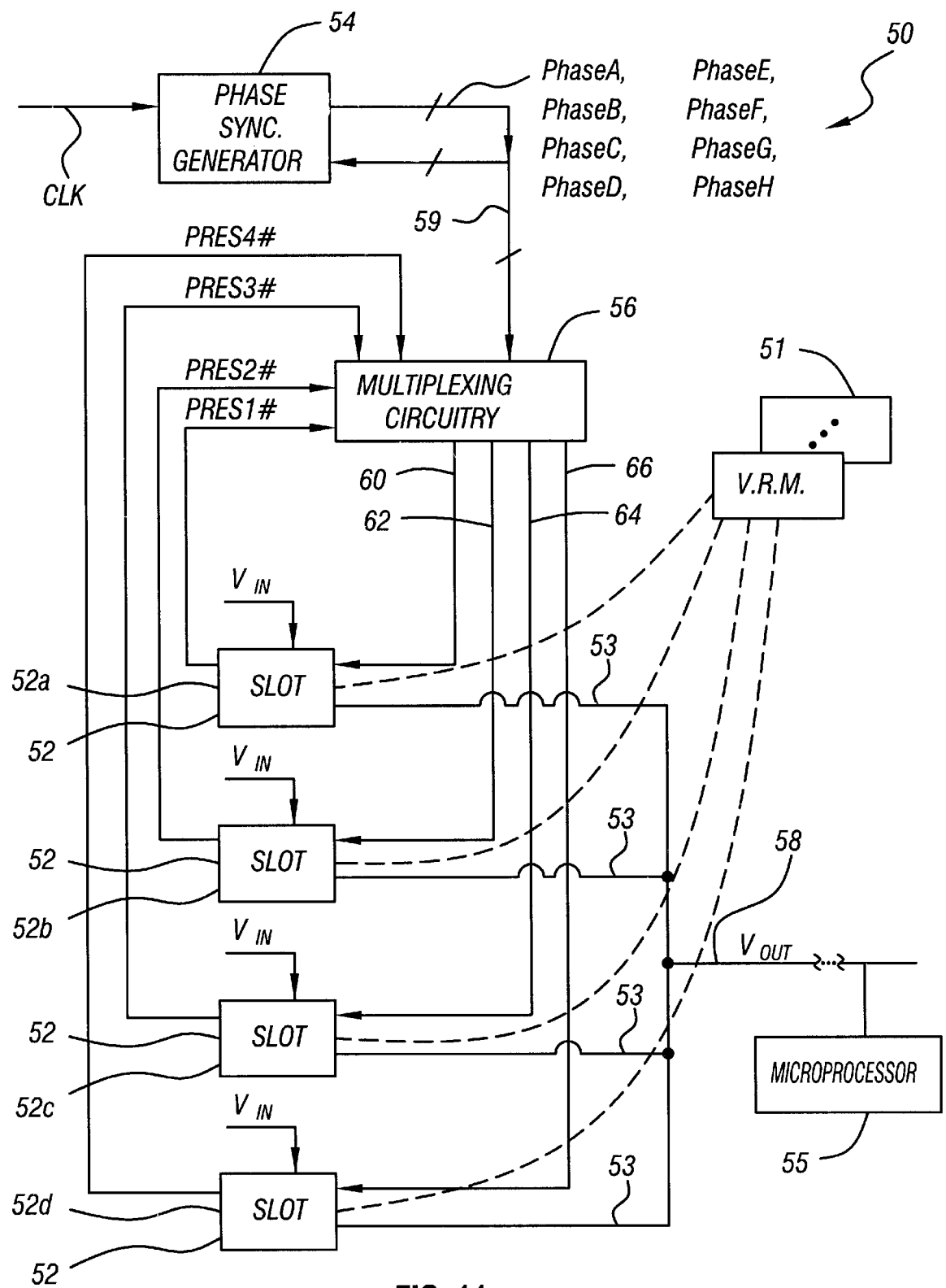
FIG. 11 is a schematic diagram of a multiple phase voltage regulator system according to an embodiment of the invention.

Referring to FIG. 11, an embodiment 50 of a multiple phase voltage regulator system in accordance with the invention includes connector slots 52 (slots 52a, 52b, 52c and 52d shown as examples), each of which may receive a corresponding switching voltage regulator module (VRM) 51. The actual number of VRMs 51 that are received, or inserted, into the slots 52 establishes the number of phases of the system 50. For example, if two VRMs 51 are inserted into the slots 52, then a two phase voltage regulator system is established. Similarly, if four VRMs 51 are inserted into the slots 52, then a four phase voltage regulator system is established.

Unlike conventional arrangements, the slots 52 are not ordered for purposes of establishing which slots 52 are to be used to form a particular number of phases. In this manner, multiplexing circuitry 56 of the system 50 routes the appropriate signals to the slots 52 that are connected to the VRMs 51 to establish a number of phases (for the system 50) that is equal to the number of inserted VRMs 51. Thus, the insertion of two VRMs 51 into any two of the slots 52 establishes a two phase system 50, the insertion of three VRMs 51 into any three of the slots 52 establishes a three phase system 50, etc. In some embodiments of the invention, if only one VRM 51 is inserted into one of the slots 52, then a single phase voltage regulator system is established. As an example, the system 50 may reside on a motherboard of a computer system for purposes of providing power to components (one or more microprocessors 55, for example) of the computer system. Thus, due to the routing of the synchronization signals by the multiplexing circuitry 56, the'slots 52 are interchangeable.

More specifically, in some embodiments of the invention, the multiplexing circuitry 56 selectively routes synchronization signals to the slots 52. The synchronization signals control the timing of the energization/de-energization cycles of VRMs 51 that are inserted into the slots 52 for purposes of establishing interleaved operation. The synchronization signal that is routed to a particular slot 52 is a function of whether a VRM 51 is inserted into that slot 52 and the total number of VRMs 51 that are inserted into the slots 52. If no VRM 51 is inserted into a particular slot 52, then the multiplexing circuitry 56, in some embodiments of the invention, grounds the synchronization line that is associated with that slot 52. Otherwise if a VRM 51 is inserted into a particular slot 52, the multiplexing circuitry 56 routes a synchronization signal to that slot 52 to establish the appropriate timing for the inserted VRM 51.

Each slot 52 has a voltage input pin connector contact that receives an input voltage (called $V_{IN}$), and each slot 52 has an output pin connector contact that is coupled to an output terminal line 53. The output terminal lines 53 are coupled together to provide an output voltage (called $V_{OUT}$) at an output node 58 that furnishes power to the computer system. In some embodiments of the invention, the slots 52 may provide multiple output voltages on multiple output terminals. However, regardless of the types of VRMs 51 that are used, the voltage input terminals of the slots 52 are coupled together in parallel, and the voltage output terminals of the slots 52 are coupled together in parallel.

The output terminals of the multiplexing circuitry 56 are coupled to synchronization communication lines that communicate the synchronization signals from the multiplexing circuit 56 to the slots 52. For example, a synchronization signal communication line 60 is coupled between an output terminal of the multiplexing circuitry 56 and a conductive contact of the slot 52a; a synchronization signal communication line 62 is coupled between an output terminal of the multiplexing circuitry 56 and a conductive contact of the slot 52b; a synchronization signal communication line 64 is coupled between an output terminal of the multiplexing circuitry 56 and a conductive contact of the slot 52c; and a synchronization signal communication line 66 is coupled between an output terminal of the multiplexing circuitry 56 and a conductive contact of the slot 52d. The input terminals of the multiplexing circuit 56 receive synchronization signals from conductive lines 59 that are coupled to the output terminals of a phase synchronized generator 54. Based on which slots 52 have inserted VRMs 51 and the number of inserted VRMs 51, the multiplexing circuitry 56 selectively routes the synchronization signals from the conductive lines 59 to the slots 52.

For purposes of determining which slots 52 have inserted VRMs 51, in some embodiments of the invention, each slot 52 provides a presence signal (called PRES1#, PRES2#, PRES3# and PRES4#, as examples). As an example, each presence signal may be formed by a terminal of an associated pullup resistor that has its other terminal coupled to a positive supply voltage and ground. When a VRM 51 is inserted into a particular slot 52, the VRM 51 pulls the presence signal low to indicate that the VRM 51 is present in the slot 52. Otherwise, the presence signal remains in a high logic state to indicate the absence of a VRM in the associated slot 52. Other techniques and arrangements may be used to generate the presence signals.

Exemplary synchronization signals called PhaseA, PhaseB, PhaseC, PhaseD, PhaseE, PhaseF, PhaseG and PhaseH are depicted in FIGS. 12, 13, 14, 15, 16, 17, 19 and 20, respectively. All of these synchronization signals may be generated by the phased synchronization generator 54 from a master system clock signal (called CLK), as described below. As described below, the phase synchronized generator 54 also generates two synchronization signals called PhaseI (FIG. 21) and PhaseJ (FIG. 22) that the generator 54 uses to generate the other synchronization signals. The multiplexing circuitry 56 selects the appropriate synchronization signals and routes the selected synchronization signals to the appropriate slots 52 based on the particular multiple phase interleaved voltage regulator system to be established. The synchronization signals are synchronized to the rising, or positive, edges of a master clock signal (called CLK), and each cycle of a particular synchronization signal lasts for twelve cycles of the CLK signal, in some embodiments of the invention. As depicted, each synchronization signal has a duty cycle of one half, though the synchronization criteria is established by the relative phase of the rising (or falling) edge of each synchronization signal to any other. This lends itself to edge, as well as level-triggered synchronization. Therefore, a particular synchronization signal enables the energization/de-energization cycle of a particular VRM for six cycles of the CLK signal and disables the energization/de-energization cycle for six cycles of the CLK signal. Therefore, the synchronization signals are distinguishable by their different phases. The multiplexing circuitry 56 selects a particular group of the synchronization signals and routes the synchronization signals from the selected group to the appropriate slot 52 to implement a particular interleaved voltage regulator system, as described below.

For example, for a two phase interleaved voltage regulator system, the multiplexing circuitry 56 selects the PhaseA and PhaseD synchronization signals from the conductive lines 59 and routes the PhaseA and PhaseD synchronization signals to the two slots 52 that have inserted VRMs 51. As depicted in FIGS. 12 and 15, the PhaseA and PhaseD synchronization signals are 180° out of phase to implement the two phase interleaved operation.

For a three phase interleaved voltage regulator system, the multiplexing circuitry 56 selects the PhaseA, PhaseC and PhaseE synchronization signals from the conductive lines 59 and routes the PhaseA, PhaseC and PhaseE synchronization signals to the three slots 52 that have inserted VRMs 51. As depicted in FIGS. 12, 14 and 16, the PhaseA synchronization signal is 120° out of phase with the PhaseC synchronization signal, and the PhaseE synchronization signal is 120° out of phase with the PhaseC synchronization signal and 240° out of phase with the PhaseA synchronization signal to implement the three phase interleaved operation.

The PhaseA (FIG. 12), PhaseB (FIG. 13), PhaseD (FIG. 15) and PhaseF (FIG. 17) synchronization signals may be used for a four way interleaved voltage regulator system. The PhaseB signal is 90° out of phase with the PhaseA signal; the PhaseD signal is 90° out of phase with the PhaseB signal; and the PhaseF signal is 90° out of phase with the PhaseD signal.

The multiplexing circuitry 56 may select the PhaseA (FIG. 12), PhaseH (FIG. 20), Phase C (FIG. 14), PhaseE (FIG. 16) and PhaseG (FIG. 19) synchronization signals to implement a six way interleaved voltage regulator system. For this implementation, six VRMs 51 are inserted into six (only four slots 52 are depicted in FIG. 11) of the slots 52. The PhaseH signal is 60° out of phase with the PhaseA signal; the PhaseC signal is 60° out of phase with the PhaseH signal; the PhaseD signal is 60° out of phase with the PhaseC signal; the PhaseE signal is 60° out of phase with the PhaseD signal and the PhaseG signal is 60° out of phase with the PhaseE signal.

If only one VRM 51 is inserted into the slots 52, then the multiplexing circuitry 56 may select any (the PhaseA synchronization signal, for example) of the synchronization signals and route the selected synchronization signal to the slot 52 that has the inserted VRM 51 to establish a single phase voltage regulator system.

Figure 23:
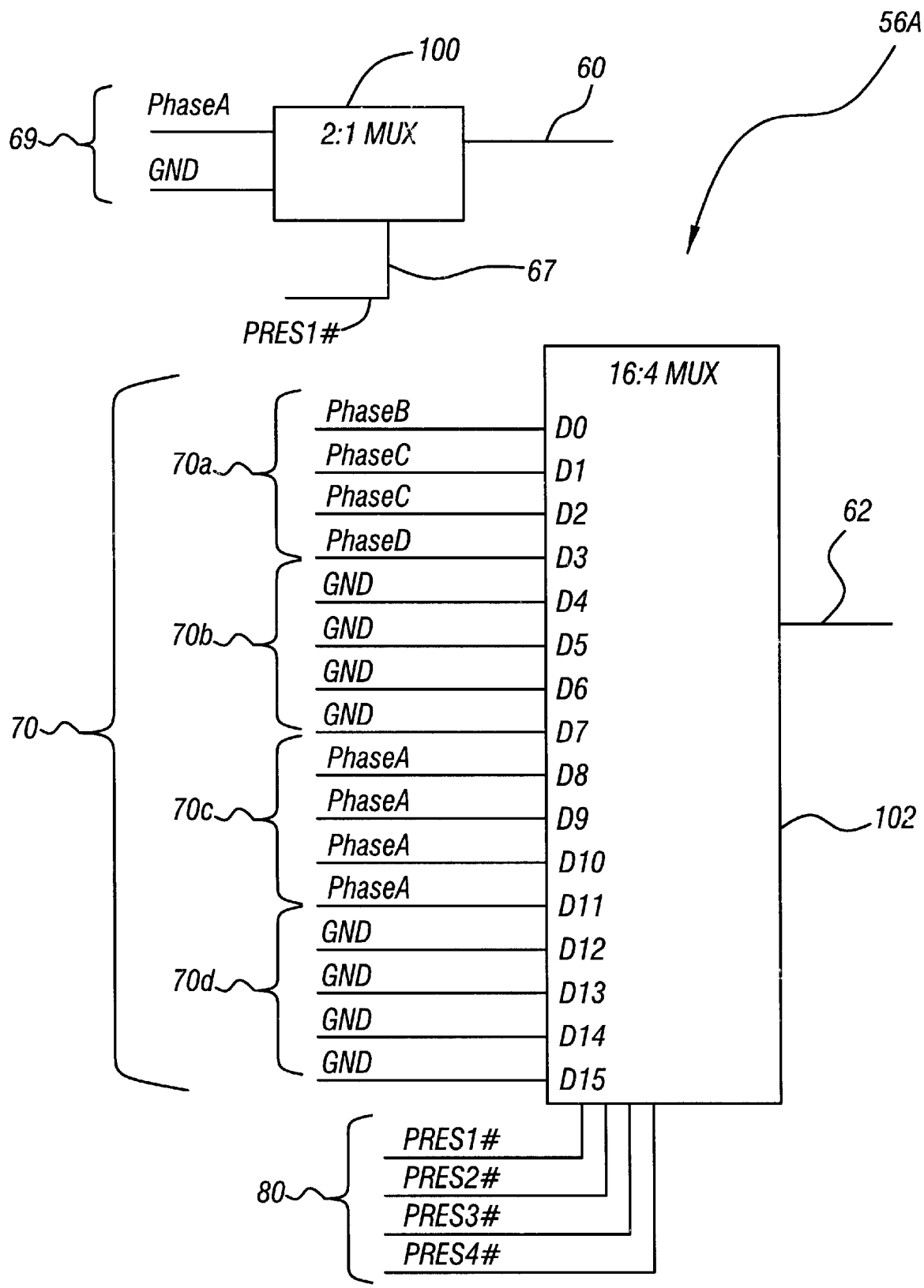
FIG. 23 is a schematic diagram of a portion of the multiplexing circuitry of the system of FIG. 7 according to an embodiment of the invention.

Referring to FIG. 23, a circuit 56A of the multiplexing circuitry 56 includes a 2:1 (two input lines 69 that are selected by one select line 67) multiplexer 100 and a 16:4 (sixteen input lines 70 that are selected by four select lines 80) multiplexer 102 that provide the synchronization signals to the synchronization communication lines 60 and 62, respectively. One input terminal of the multiplexer 100 receives the PhaseA synchronization signal, and the other input terminal 69 is coupled to ground. A select input terminal 67 of the multiplexer 100 receives the PRES1# signal, and the non-inverting output terminal of the multiplexer 100 is coupled to the synchronization signal communication line 60. Thus, due to this arrangement, when the PRES1# signal has a logic one level to indicate that no VRM 51 is inserted into the slot, 51a, the multiplexer 100 furnishes a logic zero to the synchronization signal communication line 60. When the PRES1# signal has a logic zero level to indicate that a VRM 51 is inserted into the slot 51a, the multiplexer 100 routes the PhaseA synchronization signal to the synchronization signal communication line 60. Because the multiplexing circuitry 56 always selects the PhaseA synchronization signal regardless of the number of phases of the system 30, the multiplexing circuit 56 routes the PhaseA synchronization signal to the slot 51a as long as a VRM 51 has been inserted into the slot 51a. As described above, the PhaseA synchronization signal is used regardless of the number of phases of the system 10.

The multiplexer 102 of the multiplexing circuitry 56A has its output terminal coupled to the synchronization communication line 62 to route the appropriate synchronization signal (if any) to the corresponding contact of the slot 52b. Select lines 80 of the multiplexer 102 receive, in the order of most significant bit (MSB) to least significant bit (LSB), the PRES1#, PRES2#, PRES3# and PRES4# signals. For purposes of convenience, the sixteen input terminals 70 of the multiplexer 102 are labeled in order from the least significant to the most significant using the following sixteen identifiers: D0, D1, D2, D3, . . . D14 and D15. Thus, using this notation, "D0" refers to the input terminal 70 that is selected when the bits that are indicated by the select lines 80 indicate "0," "D3" refers to the input terminal 70 that is selected when the bits that are indicated by the select lines 80 indicate "3," D15 refers to the input terminal 70 that is selected when the bits that are indicated by the select lines 80 indicate "15," etc.

The input terminals 70 are basically divided into contiguous groups 70a, 70b, 70c and 70d. The input terminals of the groups 70d (including the D12, D13, D14 and D15 input terminals 70) and 70b (including the D4, D5, D6 and D7 input terminals 70) are selected when the PRES2# signal has a logic one level to indicate that a VRM 51 is not inserted into the slot 52b. Each input terminal of the groups 70b and 70d is coupled to ground. Therefore, when no VRM 51 is inserted into the slot 52b, the multiplexer 102 grounds the synchronization signal communication line 62.

The input terminals of the group 70c (including the D8, D9, D10 and D11 input terminals 70) are selected when the PRES2# signal has a logic zero level to indicate that a VRM 51 is inserted into the slot 52b and the PRES1# signal has a logic one level to indicate that a VRM 51 is not inserted into the slot 52a. Each input terminal of the group 70c receives the PhaseA synchronization signal. Therefore, the multiplexer 102 routes the PhaseA synchronization signal to the slot 51b as long as a VRM 51 has been inserted into the slot 52b and no VRM 51 is inserted into the slot 52a. As described above, the PhaseA synchronization signal is used regardless of the number of phases of the system 50.

The input terminals of the group 70a (including the D0, D1, D2 and D3 input terminals 70) are selected when both the PRES2# and PRES#1 signals have a logic zero levels to indicate that VRMs 51 are inserted into both slots 52a and 52b. When this condition occurs, the multiplexer 102 selects the appropriate input terminal from the group 70 to establish the appropriate phase of the system. Because the slots 52a and 52b have inserted VRMs 51, the number of phases depends on whether VRMs 51 are inserted into the other slots 52c and 52d. In this manner, if VRMs 51 are inserted into both slots 52c and 52d, then the PRES3# and PRES4# signals have logic zero levels to cause the multiplexer 102 to select the D0 input terminal 40, a terminal 70 that receives the PhaseB synchronization for purposes of establishing four phases for the regulator system 10. If a VRM 51 is inserted into the slot 52c and not into the slot 52d, then the PRES3# has a logic zero level and the PRES4# signals has a logic one level. This condition causes the multiplexer 102 to select the D1 input terminal 70, a terminal 70 that receives the PhaseC synchronization signal for purposes of establishing three phases for the regulator system 10. Similarly, a three phase system 10 is also established if a VRM 51 is inserted into the slot 52d and not into the slot 52c, a condition that causes the multiplexer 102 to select the D2 input terminal, a terminal that receives the PhaseC synchronization signal. If a VRM 51 is neither inserted into the slot 52c nor the slot 52d, then only two VRMs 51 are inserted into the slots 52, and the multiplexer 102 selects the D3 input terminal, a terminal that receives the PhaseD synchronization signal for purposes of establishing two phases (the first phase being established by the PhaseA signal that is communicated by the multiplexer 100 to the synchronization signal communication line 60 and the second phase being established by the PhaseD signal that is communicated by the multiplexer 100 to the synchronization signal communication line 62).

Figure 24:
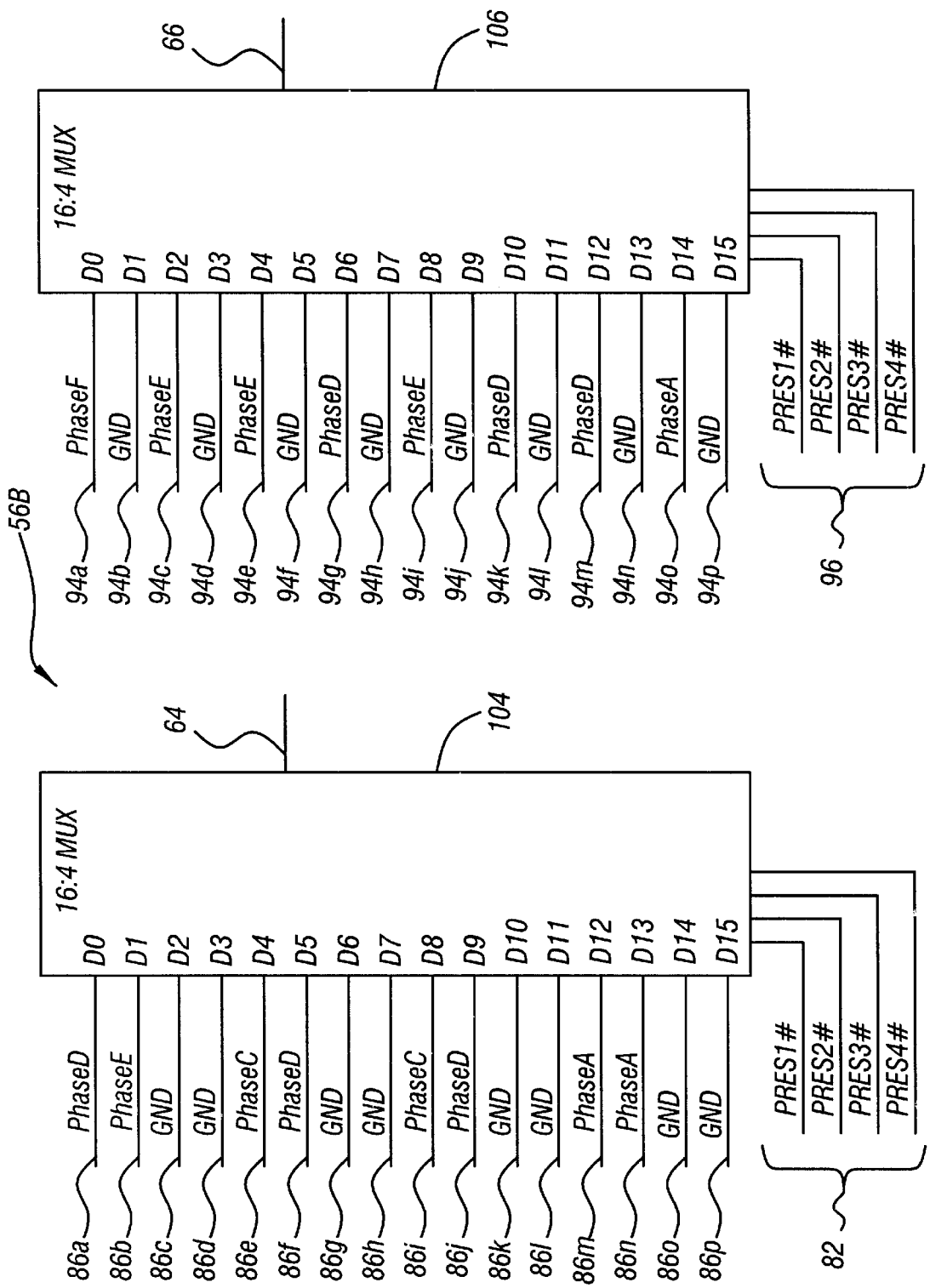
FIG. 24 is a schematic diagram of another portion of the multiplexing circuitry of the system of FIG. 11 according to an embodiment of the invention.

Referring to FIG. 24, another circuit 56B of the multiplexing circuitry 56 includes a 16:4 (sixteen input lines 86 (each individually designated by the letters a–p) that are selected by four select lines 82) multiplexer 104 and a 16:4 (sixteen input lines 94 (each individually designated by the letters a–p) that are selected by four select lines 96) multiplexer 106 that provide the synchronization signals to the synchronization signal communication lines 64 and 66, respectively.

The multiplexer 104 of the circuit 56B has its output terminal coupled to the synchronization communication line 64 to route the appropriate synchronization signal (if any) to the corresponding contact of the slot 52c. The select lines 82 of the multiplexer 104 receive, in the order of most significant bit (MSB) to least significant bit (LSB), the PRES1#, PRES2#, PRES3# and PRES4# signals. For purposes of convenience, the sixteen input terminals 83 of the multiplexer 104 are labeled in order from the least significant to the most significant using the following sixteen identifiers: D0, D1, D2, D3, . . . D14 and D15, as described above for the multiplexer 102.

The multiplexer 104 selects one of the input terminals 86c, 86d, 86g, 86h, 86k, 86l, 86o or 86p (corresponding to the D2, D3, D6, D7, D10, D11, D14 and D15 input terminals) when the PRES3# signal has a logic one level to indicate that a VRM 51 is not inserted into the slot 52c. Each of the input terminals 86c, 86d, 86g, 86h, 86k, 86l, 86o and 86p is coupled to ground. Therefore, when no VRM 51 is inserted into the slot 52c, the multiplexer 104 grounds the synchronization signal communication line 64.

The multiplexer 104 selects one of the input terminals 86m and 86n (corresponding to the D12 and D13 input terminals 86) are selected when the PRES3# signal has a logic zero level to indicate that a VRM 51 is inserted into the slot 52c and the PRES1# and PRES2# signals each have a logic one level to indicate that the absence of a VRM 51 in both slots 52a and 52b. Each of the input terminals 86m and 86n receives the PhaseA synchronization signal. Therefore, the multiplexer 104 routes the PhaseA synchronization signal to the slot 51c as long as a VRM 51 has been inserted into the slot 52c and no VRM 51 is inserted into the slots 52a and 52b. As described above, the PhaseA synchronization signal is used regardless of the number of phases of the system 50.

The multiplexer 104 selects one of the input terminals 86a, 86f or 86j for purposes of establishing a two or four phase system 50 when a VRM 51 is inserted into the slot 52c and at least one VRM 51 is inserted into the slots 52a and 52b. In this manner, if VRMs 51 are inserted into all four slots 52a, 52b, 52c and 52d, the multiplexer 104 selects the input terminal 86a to route the PhaseD synchronization signal to the synchronization signal communication line 64 to establish one of the phases of a four phase system 50. Otherwise, the multiplexer 104 selects one of the input terminals 86f or 86j when a VRM 51 is inserted into the slot 52c, no VRM is inserted into the slot 52d and only one VRM 51 is inserted into one of the slots 52a or 52b. The selection of the input terminal 86f or 86j routes the PhaseD synchronization signal to the synchronization signal communication line 64 to establish one of the phases of a two phase system 50.

The multiplexer 104 selects the input terminal 86b when VRMs 51 are inserted into each of the three slots 52a, 52b and 52c, and no VRM 51 is inserted into the slot 52d. The selection of the input terminal 86b routes the PhaseE synchronization signal to the synchronization signal communication line 64 to establish one of the phases of a three phase system 50.

The multiplexer 104 selects either the input terminal 86e or 86i when only one VRM 51 is inserted into the slot 52a or 52b; a VRM 51 is inserted into the slot 52c; and a VRM 51 is inserted into the slot 52d. The selection of the input terminal 86e or 86i routes the PhaseC synchronization signal to the synchronization signal communication line 64 to establish one of the phases of a three phase system 50.

The multiplexer 106 of the circuit 56B has its output terminal coupled to the synchronization communication line 66 to route the appropriate synchronization signal (if any) to the corresponding contact of the slot 52d. The select lines 96 of the multiplexer 106 receive, in the order of most significant bit (MSB) to least significant bit (LSB), the PRES1#, PRES2#, PRES3# and PRES4# signals. For purposes of convenience, the sixteen input terminals 94 (each individually designated by the letters a–p) of the multiplexer 106 are labeled in order from the least significant to the most significant using the following sixteen identifiers: D0, D1, D2, D3, . . . D14 and D15, as described above for the multiplexer 102.

The multiplexer 106 selects one of the input terminals 94b, 94d, 94f, 94h, 94j, 94l, 94n or 94p (corresponding to the D1, D3, D5, D7, D9, D11, D13 and D15 input terminals) when the PRES4# signal has a logic one level to indicate that a VRM 51 is not inserted into the slot 52d. Each of the input terminals 94b, 94d, 94f, 94h, 94j, 94l, 94n and 94p is coupled to ground. Therefore, when no VRM 51 is inserted into the slot 52d, the multiplexer 106 grounds the synchronization signal communication line 66.

The multiplexer 106 selects the input terminal 94o (corresponding to the D14 input terminal 94) when the PRES4# signal has a logic zero level to indicate that a VRM 51 is inserted into the slot 52d and the PRES1#, PRES2# and PRES3# signals each have a logic one level to indicate that only one VRM 51 is present in the system 50. The input terminals 94o receives the PhaseA synchronization signal. Therefore, the multiplexer 106 routes the PhaseA synchronization signal to the slot 52d to establish a single phase system 50 when the only VRM 51 present in the system 50 is inserted into the slot 52d.

The multiplexer 106 selects one of the input terminals 94g, 94k or 94m for purposes of establishing a two phase system 10 when a VRM 51 is inserted into the slot 52d and only one VRM 51 is inserted into the slots 52a, 52b or 52c. The input terminals 94g, 94k and 94m each receive the PhaseD signal for purposes of establishing one of the two phases of the system 50 when only two VRMs are inserted into one of the slots 52a, 52b or 52c and the slot 52d.

The multiplexer 106 selects the input terminal 94a when VRMs 51 are inserted into all four slots 52a, 52b, 52c and 52d. The selection of the input terminal 94a routes the PhaseF synchronization signal to the synchronization signal communication line 66 to establish one of the phases of a four phase system 50.

The multiplexer 106 selects either the input terminal 94c, 94e or 94i when a VRM 51 is inserted into the slot 52d; and only two VRMs 51 are inserted into the slots 52a, 52b and 52c. The selection of one of the input terminals 94c, 94e and 94i routes the PhaseE synchronization signal to the synchronization signal communication line 64 to establish one of the phases of a three phase system 50.

Figure 25:
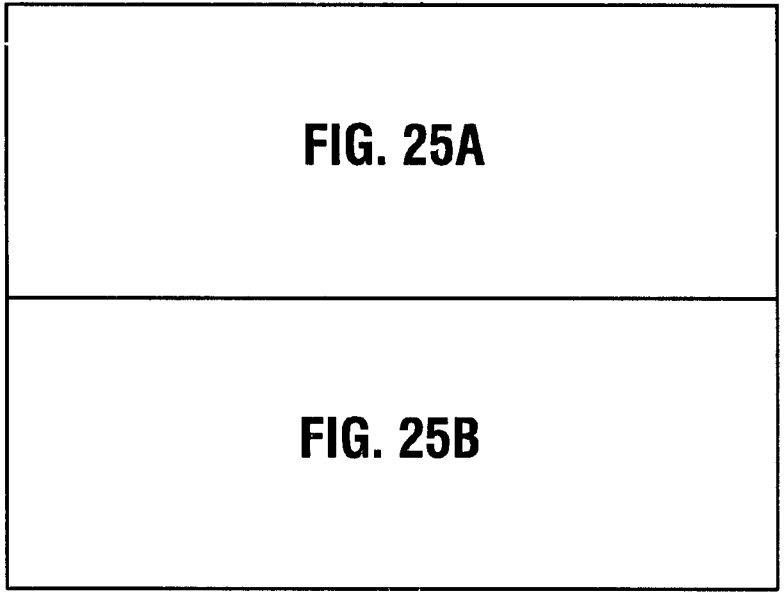
FIGS. 25 and 26 are schematic diagrams of the phased synchronization generator of the system of FIG. 11 according to different embodiments of the invention.

Referring to FIG. 25, in some embodiments of the invention, the phase synchronization generator 54 includes D-type flip flops 150b, 150c, 150d and 150e that are each clocked by the CLK signal and provide the PhaseA, PhaseB, PhaseC, PhaseD, PhaseE, PhaseF, PhaseG and PhaseH synchronization signals. In this manner, the non-inverting output terminal of the flip-flop 150b provides the PhaseA synchronization signal, and the inverting output terminal of the flip-flop 150b provides the PhaseD synchronization signal. The non-inverting output terminal of the flip-flop 150c provides the PhaseB synchronization signal, and the inverting output terminal of the flip-flop 150c provides the PhaseF synchronization signal. The non-inverting output terminal of the flip-flop 150d provides the PhaseC synchronization signal, and the inverting output terminal of the flip-flop 150d provides the PhaseG synchronization signal. The non-inverting output terminal of the flip-flop 150e provides the PhaseE synchronization signal, and the inverting output terminal of the flip-flop 150e provides the PhaseH synchronization signal.

The generator 54 also includes a D-type flip-flop 150a that is clocked by the SYS_CLK signal and furnishes two signals (called PhaseI and PhaseJ) that are intermediate signals that are used to generate the synchronization signals, as described below. The non-inverting output terminal of the flip-flop 150a provides the PhaseI synchronization signal, and the inverting output terminal of the flip-flop 150a provides the PhaseJ synchronization signal.

The non-inverting input terminal of the flip-flop 150a receives a signal (called L1) from the output terminal of logic 160 that combines the following synchronization signals in the following manner to produce the L1 signal:

$$L1 = (PhaseA \cap PhaseB \cap PhaseC \cap PhaseH) \cup (PhaseD \cap PhaseE \cap PhaseF \cap PhaseG) \quad \text{Eq. 1}$$

The non-inverting input terminal of the flip-flop 150b receives a signal (called L2) from the output terminal of logic 180 that combines the following synchronization signals in the following manner to produce the L2 signal:

$$L2 = (PhaseI \cap PhaseE \cap PhaseF \cap PhaseG) \cup (PhaseJ \cap PhaseA \cap PhaseB \cap PhaseH) \cup (PhaseJ \cap PhaseA \cap PhaseF \cap PhaseG) \quad \text{Eq. 2}$$

The non-inverting input terminal of the flip-flop 150c receives a signal (called L3) from the output terminal of logic 220 that combines the following synchronization signals in the following manner to produce the L3 signal:

$$L3 = (PhaseJ \cap PhaseA \cap PhaseG \cap PhaseH) \cup (PhaseB \cap PhaseC \cap PhaseH) \quad \text{Eq. 3}$$

The non-inverting input terminal of the flip-flop 150d receives a signal (called L4) from the output terminal of logic 240 that combines the following synchronization signals in the following manner to produce the L4 signal:

$$L4 = (PhaseJ \cap PhaseA \cap PhaseB \cap PhaseH) \cup (PhaseJ \cap PhaseB \cap PhaseC \cap PhaseD) \cup (PhaseB \cap PhaseC \cap PhaseH) \quad \text{Eq. 4}$$

The non-inverting input terminal of the flip-flop 150e receives a signal (called L5) from the output terminal of logic 260 that combines the following synchronization signals in the following manner to produce the L5 signal:

$$L5 = (PhaseI \cap PhaseG) \cap PhaseJ \cap PhaseD) \cup (PhaseB \cap PhaseE \cap PhaseC \cap PhaseF) \quad \text{Eq. 5}$$

Figure 26:
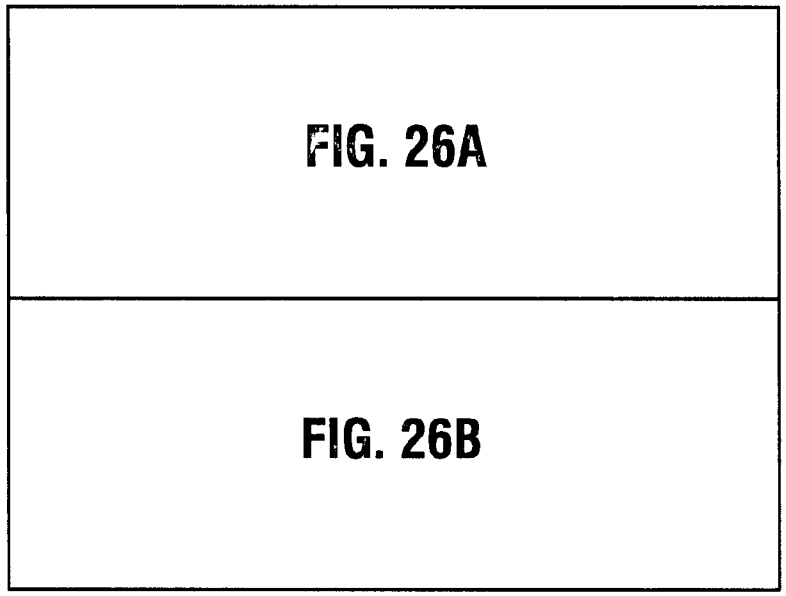
Figure 25A:
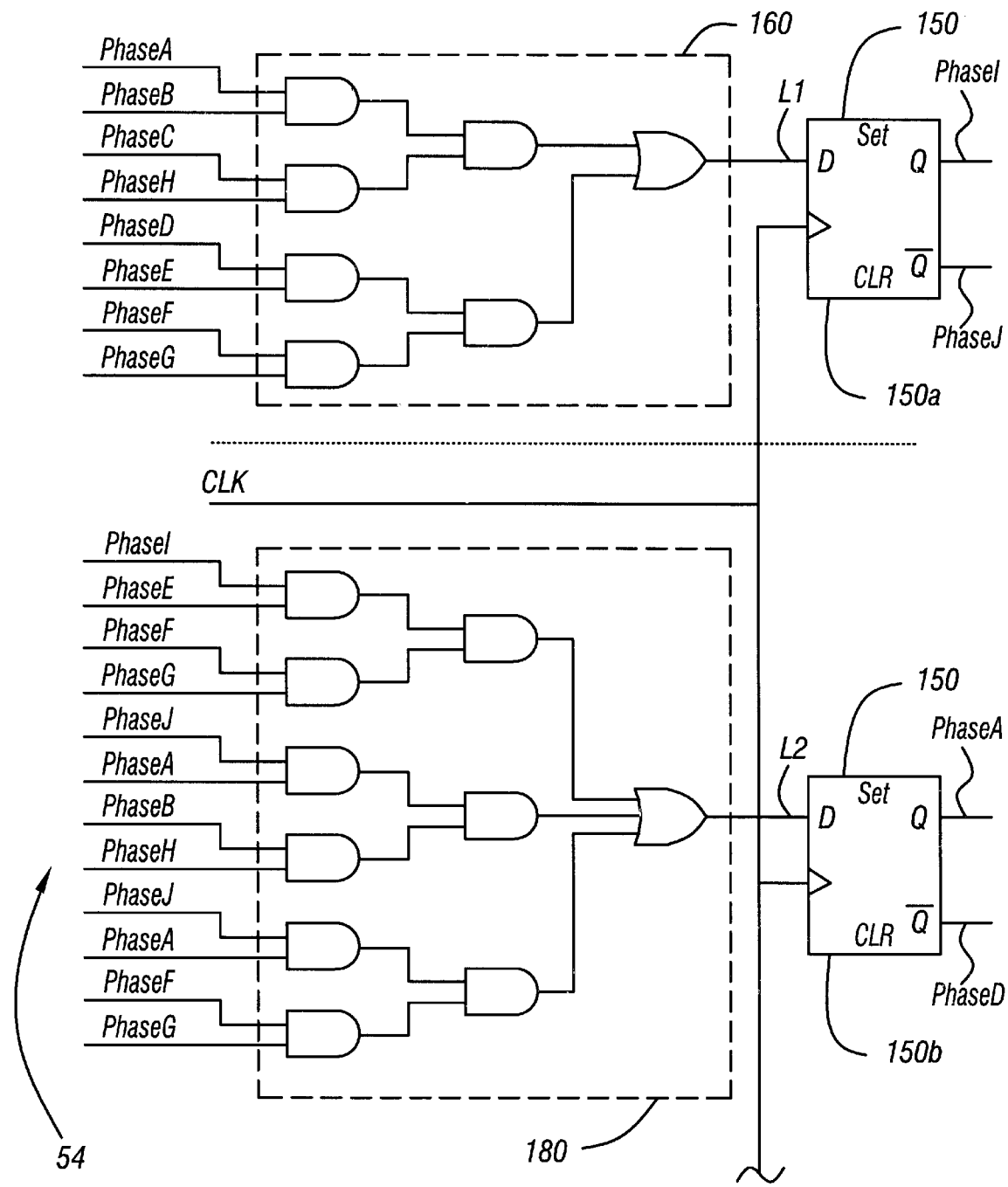
Figure 25B:
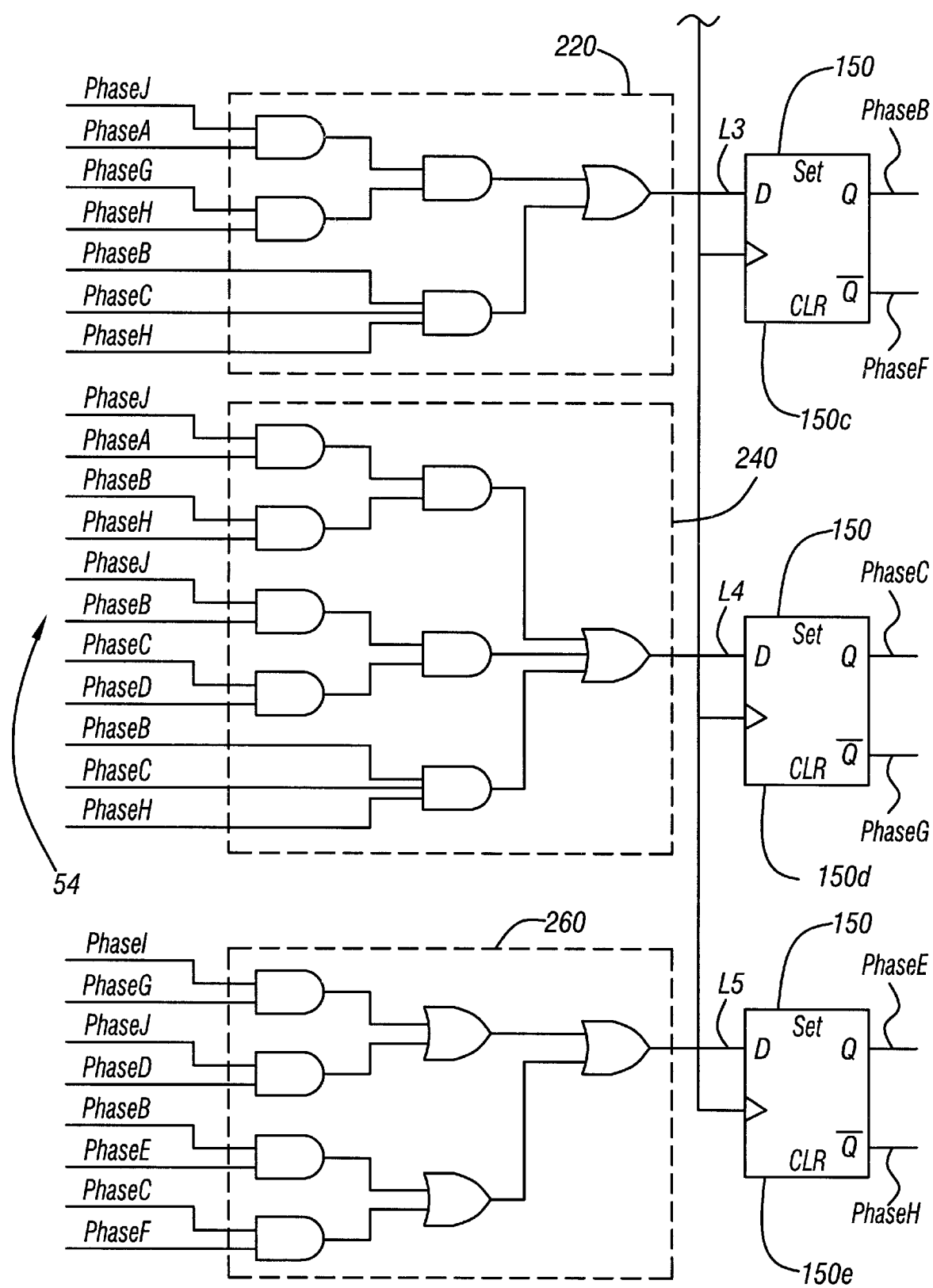
Figure 26A:
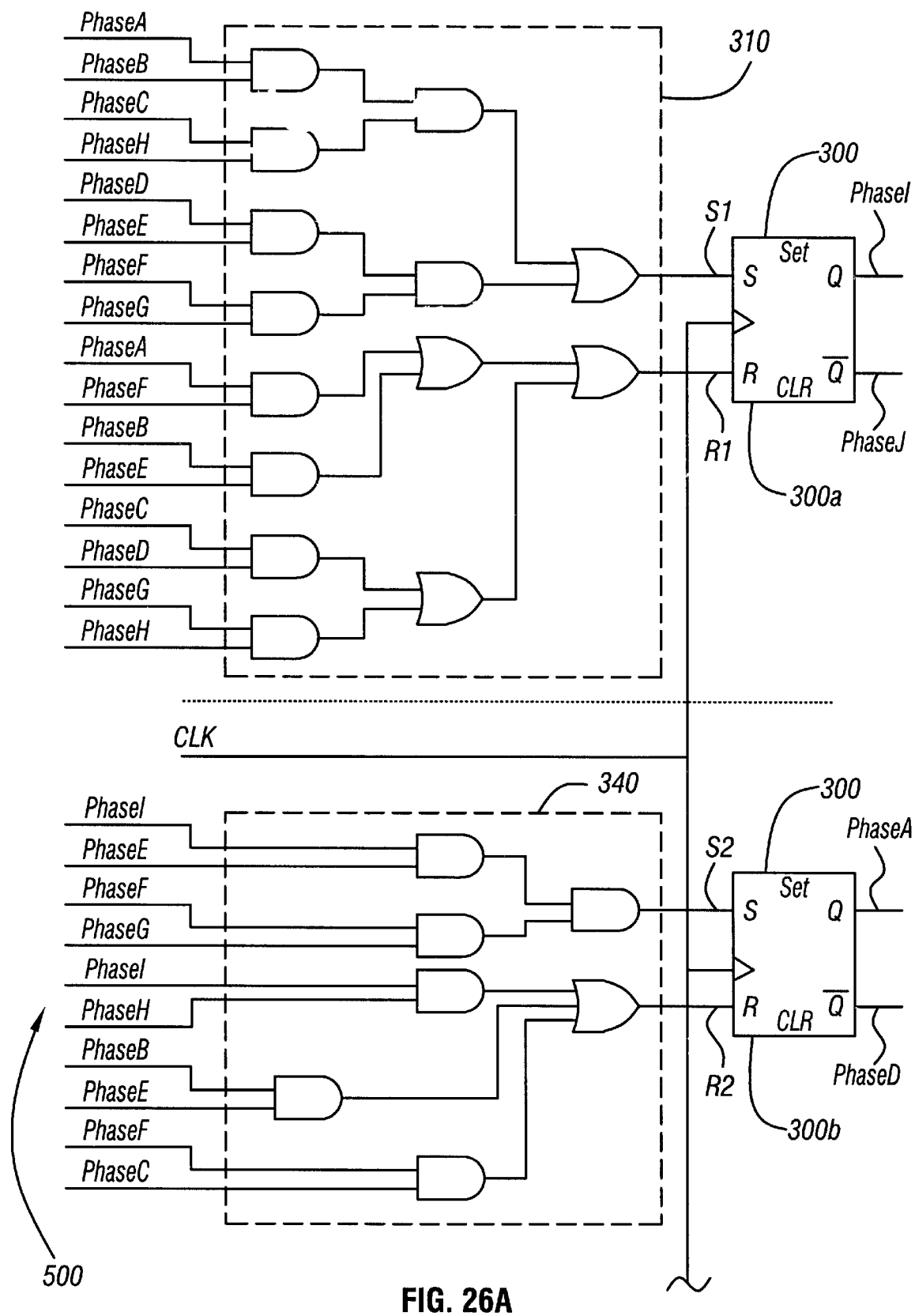
Figure 26B:
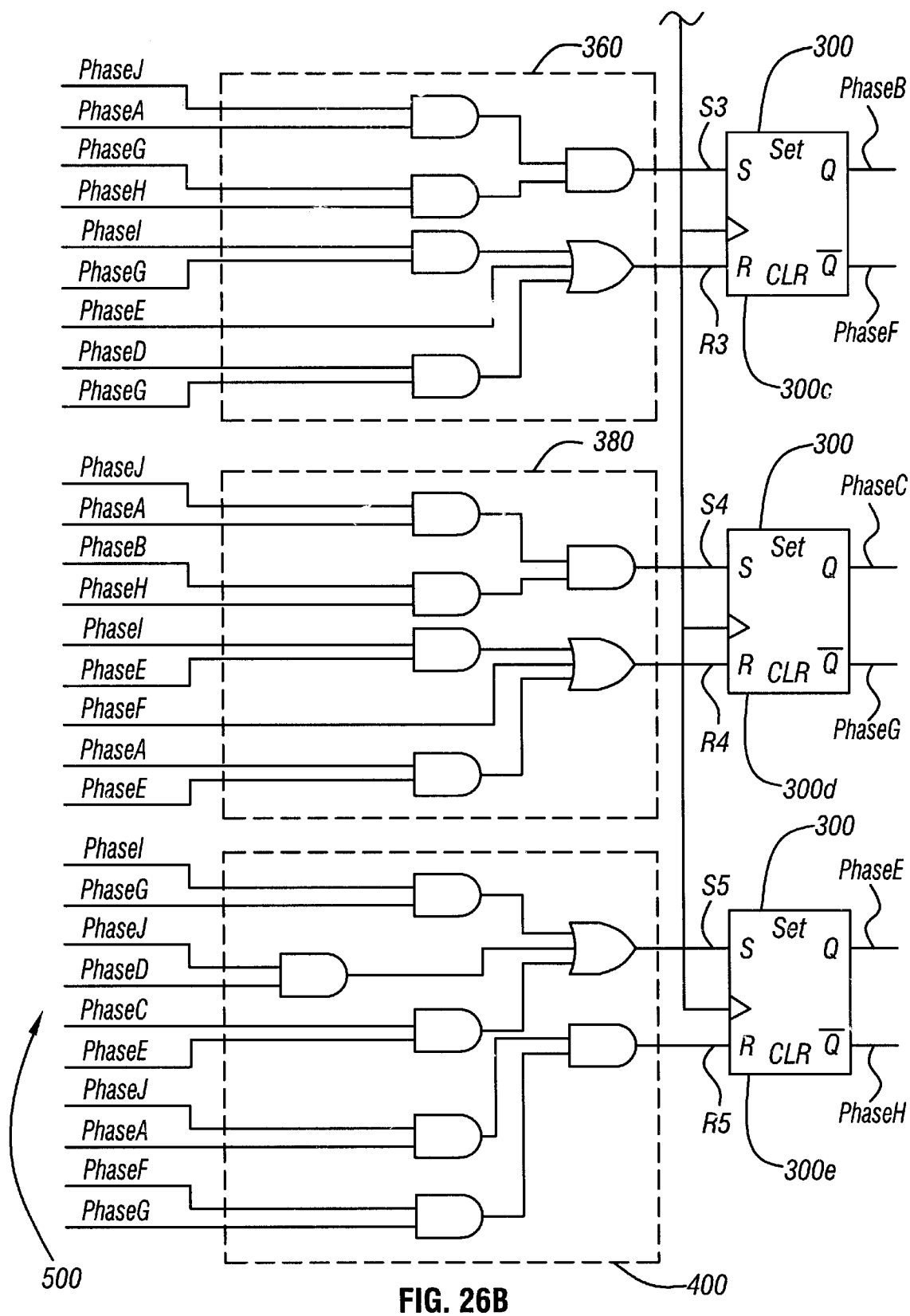

The phase synchronized generator may assume numerous different forms. For example, FIG. 26 depicts an embodiment 500 of another phased synchronized generator in accordance with the invention that may be used in place of the generator 54. In some embodiments of the invention, the phase synchronized generator 54 includes SR-type flip flops 300b, 300c, 300d and 300e that are each clocked by the SYS_CLK signal and provide the PhaseA, PhaseB, PhaseC, PhaseD, PhaseE, PhaseF, PhaseG and PhaseH synchronization signals. In this manner, the non-inverting output terminal of the flip-flop 300b provides the PhaseA synchronization signal, and the inverting output terminal of the flip-flop 300b provides the PhaseD synchronization signal. The non-inverting output terminal of the flip-flop 300c provides the PhaseB synchronization signal, and the inverting output terminal of the flip-flop 300c provides the PhaseF synchronization signal. The non-inverting output terminal of the flip-flop 300d provides the PhaseC synchronization signal, and the inverting output terminal of the flip-flop 300d provides the PhaseG synchronization signal. The non-inverting output terminal of the flip-flop 300e provides the PhaseE synchronization signal, and the inverting output terminal of the flip-flop 300e provides the PhaseH synchronization signal.

The generator 500 also includes an SR-type flip-flop 300a that is clocked by the SYS_CLK signal and furnishes two signals (called PhaseI and PhaseJ) that are intermediate signals that are used to generate the synchronization signals, as described below. The non-inverting output terminal of the flip-flop 300a provides the PhaseI synchronization signal, and the inverting output terminal of the flip-flop 300a provides the PhaseJ synchronization signal.

The S input terminal of the flip-flop 300a receives a signal (called S1) from an output terminal of logic 310 that combines the following synchronization signals in the following manner to produce the S1 signal:

$$S1 = (PhaseA \cap PhaseB \cap PhaseC \cap PhaseH) \cup (PhaseD \cap PhaseE \cap PhaseF \cap PhaseG) \quad \text{Eq. 6}$$

The R input terminal of the flip-flop 300a receives a signal (called R1) from another output terminal of the logic 310 that combines the following synchronization signals in the following manner to produce the R1 signal:

$$R1=((PhaseA \cap PhaseF) \cup (PhaseB \cap PhaseE)) \cup ((PhaseC \cap PhaseD) \cup (PhaseG \cap PhaseH)) \quad \text{Eq. 7}$$

The S input terminal of the flip-flop 300b receives a signal (called S2) from an output terminal of logic 340 that combines the following synchronization signals in the following manner to produce the S2 signal:

$$S2=PhaseI \cap PhaseE \cap PhaseF \cap PhaseG \quad \text{Eq. 8}$$

The R input terminal of the flip-flop 300b receives a signal (called R2) from another output terminal of the logic 310 that combines the following synchronization signals in the following manner to produce the R2 signal:

$$R2=(PhaseI \cap PhaseH) \cup (PhaseB \cap PhaseE) \cup (PhaseC \cap PhaseF) \quad \text{Eq. 9}$$

The S input terminal of the flip-flop 300c receives a signal (called S3) from an output terminal of logic 360 that combines the following synchronization signals in the following manner to produce the S3 signal:

$$S3=PhaseJ \cap PhaseA \cap PhaseG \cap PhaseH \quad \text{Eq. 10}$$

The R input terminal of the flip-flop 300c receives a signal (called R3) from another output terminal of the logic 360 that combines the following synchronization signals in the following manner to produce the R3 signal:

$$R3=(PhaseI \cap PhaseG) \cup PhaseE \cup (PhaseD \cap PhaseG) \quad \text{Eq. 11}$$

The S input terminal of the flip-flop 300d receives a signal (called S4) from an output terminal of logic 380 that combines the following synchronization signals in the following manner to produce the S4 signal:

$$S4=PhaseJ \cap PhaseA \cap PhaseB \cap PhaseH \quad \text{Eq. 12}$$

The R input terminal of the flip-flop 300d receives a signal (called R4) from another output terminal of the logic 360 that combines the following synchronization signals in the following manner to produce the R4 signal:

$$R4=(PhaseI \cap PhaseE) \cup PhaseF \cup (PhaseA \cap PhaseE) \quad \text{Eq. 13}$$

The S input terminal of the flip-flop 300e receives a signal (called S5) from an output terminal of logic 400 that combines the following synchronization signals in the following manner to produce the S5 signal:

$$S5=(PhaseI \cap PhaseG) \cup (PhaseJ \cap PhaseD) \cup (PhaseC \cap PhaseF) \quad \text{Eq. 14}$$

The R input terminal of the flip-flop 300e receives a signal (called R5) from another output terminal of the logic 400 that combines the following synchronization signals in the following manner to produce the R5 signal:

$$R5=PhaseJ \cap PhaseA \cap PhaseF \cap PhaseG \quad \text{Eq. 15}$$

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. An apparatus comprising:
   connectors, each connector capable of receiving and coupling a different voltage regulator module to a circuit board; and
   a circuit coupled to the connectors to form a multiple phase voltage regulator system out of the voltage regulator modules received by the connectors and establish the number of phases of the multiple phase voltage regulator system based on the number of voltage regulator modules received by the connectors.

2. The apparatus of claim 1, wherein the circuit comprises:
   a synchronization signal generator to generate switching synchronization signals for the multiple phase voltage regulator system; and
   multiplexing circuitry to selectively route the synchronization signals to the connectors to establish the number of phases of the multiple phase regulator system based on the number of voltage regulator modules received by the connectors.

3. The apparatus of claim 2, wherein
   the multiplexing circuitry selects the synchronization signals based on the number of voltage regulator modules received by the connectors.

4. The apparatus of claim 1, wherein
   the circuit selects the synchronization signals based on the number of voltage regulator modules received by the connectors.

5. The apparatus of claim 1, wherein the circuit establishes either a two phase, three phase or four phase multiple phase voltage regulator system based on the number of voltage regulator modules received by the connectors.

6. The apparatus of claim 1, wherein the number of phases is not dependent on a predefined pattern for inserting the voltage regulator modules into the connectors.

7. A method comprising:
   providing connectors, each connector capable of receiving and coupling a different voltage regulator module to a circuit board;
   forming a multiple phase voltage regulator system out of the voltage regulator modules that are received by the connectors; and
   establishing the number of phases of the multiple phase voltage regulator system based on the number of voltage regulator modules received by the connectors.

8. The method of claim 7, further comprising:
   generating synchronization signals; and
   selecting the synchronization signals based on the number of voltage regulator modules received by the connectors.

9. The method of claim 7, further comprising:
   establishing either a two phase, three phase or four phase multiple phase voltage regulator system based on the number of voltage regulator modules received by the connectors.

10. A computer system comprising:
    a circuit board;
    at least one microprocessor coupled to the circuit board to receive power from the circuit board;
    connectors, each connector capable of receiving and coupling a different voltage regulator module to a circuit board; and
    a circuit coupled to the connectors to form a multiple phase voltage regulator system out of the voltage regulator modules that are received by the connectors and establish the number of phases of the multiple phase voltage regulator system based on the number of voltage regulator modules received by the connectors.

11. The computer system of claim 10, wherein the circuit comprises:

a synchronization signal generator to generate switching synchronization signals for the multiple phase voltage regulator system; and multiplexing circuitry to selectively route the synchronization signals to the connectors to establish the number of phases of the multiple phase voltage regulator system based on the number of voltage regulator modules received by the connectors.

12. The computer system of claim 11, wherein the multiplexing circuitry selects different groups of the synchronization signals based on the number of voltage regulator modules received by the connectors.

13. The computer system of claim 11, wherein the circuit selects different groups of the synchronization signals based on the number of voltage regulator modules received by the connectors.

14. The computer system of claim 10, wherein the circuit establishes either a two phase, three phase or four phase multiple phase voltage regulator system based on the number of voltage regulator modules received by the connectors.

15. The computer system of claim 10, wherein the number of phases is not dependent on a predefined pattern for inserting the voltage regulator modules into the connectors.

16. A synchronization generator usable with a multiphase voltage regulator system, comprising:

flip-flops, each flip-flop synchronized to a clock signal to furnish a different synchronization signal associated with a different phase of the regulator system; and logic coupled to the flip-flops to combine current states of the synchronization signals to produce future states of the synchronization signals.

17. The generator of claim 16, wherein the flip-flops comprise:

SR-type flip-flops.

18. The generator of claim 16, wherein the flip-flops comprise:

D-type flip-flops.

19. The generator of claim 16, wherein the synchronization signals are associated with at least four different phases of the regulator system.

20. The generator of claim 16, wherein the synchronization signals are associated with at least six different phases of the regulator system.

21. A method comprising:

synchronizing flip-flops to a clock signal;

using each flip-flop to furnish a different synchronization signal associated with a different phase of a voltage regulator system; and combining current states of the synchronization signals to produce future states of the synchronization signals.

22. The method of claim 21, further comprising:

providing the synchronization signals to voltage regulator modules of the system to establish at least four different phases of the regulator system.

23. The method of claim 21, further comprising:

providing the synchronization signals to voltage regulator modules of the system to establish at least six different phases of the regulator system.

* * * * *